(12) United States Patent
Morrison et al.

(10) Patent No.: US 12,278,046 B2
(45) Date of Patent: Apr. 15, 2025

(54) SYSTEMS AND METHODS FOR TUNABLE HAPTIC DAMPING

(71) Applicant: Dell Products L.P., Round Rock, TX (US)

(72) Inventors: Jason Scott Morrison, Chadron, NE (US); Yiming Chou, Taipei (TW)

(73) Assignee: Dell Products L.P., Round Rock, TX (US)

( * ) Notice: Subject to any disclaimer, the term of this patent is extended or adjusted under 35 U.S.C. 154(b) by 259 days.

(21) Appl. No.: 18/148,663

(22) Filed: Dec. 30, 2022

(65) Prior Publication Data
US 2024/0221985 A1 Jul. 4, 2024

(51) Int. Cl.
*H01F 7/08* (2006.01)
*A63F 13/285* (2014.01)
*G05G 5/03* (2008.04)

(52) U.S. Cl.
CPC ............ *H01F 7/081* (2013.01); *G05G 5/03* (2013.01); *A63F 13/285* (2014.09); *G05G 2505/00* (2013.01)

(58) Field of Classification Search
CPC .............. G06F 2203/015; G06F 3/016; H01J 2237/0432
See application file for complete search history.

(56) References Cited

U.S. PATENT DOCUMENTS

| | | | |
|---|---|---|---|
| 11,921,930 B1* | 3/2024 | Chou | G06F 3/016 |
| 2014/0098038 A1* | 4/2014 | Paek | G06F 3/04886 345/173 |
| 2019/0050056 A1* | 2/2019 | Szeto | H01F 7/1615 |
| 2021/0347221 A1* | 11/2021 | Park | B60G 17/019 |
| 2024/0221985 A1* | 7/2024 | Morrison | H01F 7/081 |
| 2024/0226725 A1* | 7/2024 | Cox | A63F 13/24 |

* cited by examiner

Primary Examiner — Van N Chow
(74) Attorney, Agent, or Firm — Norton Rose Fulbright US LLP (57) ABSTRACT

An input device may receive, from an information handling system, a first instruction to adjust a tension on a damping medium of a linear magnetic ram of the input device. The input device may adjust the tension on the damping medium based on the first instruction.

20 Claims, 8 Drawing Sheets

SYSTEMS AND METHODS FOR TUNABLE HAPTIC DAMPING

FIELD OF THE DISCLOSURE

The instant disclosure relates to information handling systems. More specifically, portions of this disclosure relate to adaptive damping for a linear magnetic ram in an input device connected to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A variety of input devices are available for use in providing user input to information handling systems. For example, popular input devices include keyboards, computer mice, handheld controllers, such as gamepads, and other input devices. To enhance immersion, particularly when executing gaming applications, input devices may include rumble modules, such as rumble modules including eccentric rotating mass (ERM) motors, to provide haptic feedback. The ability to provide haptic feedback using rumble modules including ERM motors may, however, be limited, as ERMs of the rumble modules may be fixed in frequency and may only be adjustable with respect to intensity.

Shortcomings mentioned here are only representative and are included simply to highlight that a need exists for improved information handling systems. Embodiments described herein address certain shortcomings but not necessarily each and every one described here or known in the art. Furthermore, embodiments described herein may present other benefits than, and be used in other applications than, those of the shortcomings described above.

SUMMARY

An input device, such as a handheld controller, for an information handling system may include a linear magnetic ram for generating a wide range of haptic feedback effects and patterns. A linear magnetic ram haptic feedback module may, for example, operate at a wide range of frequencies and intensities. A damping medium that a hammer of a linear magnetic ram is configured to impact to provide haptic feedback may have an adjustable tension to provide an even more versatile range of haptic feedback effects. For example, adjustments to a tension of a damping medium of a linear magnetic ram may adjust a feel and/or sound of haptic feedback generated by the linear magnetic ram. Such haptic feedback may enhance a user experience by providing for more immersive gaming experiences.

A method for adjusting a tension on a damping medium of a linear magnetic ram may include receiving, by an input device from an information handling system, a first instruction to adjust a tension on a damping medium of a linear magnetic ram of the input device. The input device may, for example, be a handheld controller or other input device. The input device may then adjust a tension on the damping medium based on the first instruction. In some embodiments, the instruction may, for example, include an indication of a time period for adjustment of the tension on the damping medium, and the tension of the damping medium may be adjusted further based on the indication of the time period.

In some embodiments, the method may also include receiving, by the input device from the information handling system, a second instruction to cause a hammer of the linear magnetic ram to impact the damping medium after adjusting the tension on the damping medium. The method may further include causing, by the input device, the hammer to impact the damping medium after adjusting the tension on the damping medium. Thus, a tension on the damping medium may be adjusted prior to the hammer of the linear magnetic ram impacting the damping medium to adjust a haptic effect generated by the linear magnetic ram.

Adjusting the tension on the damping medium may, for example, include stretching the damping medium along a first axis. In some embodiments, a shape memory alloy actuator of the linear magnetic ram may adjust the tension on the damping medium. Adjusting the tension on the damping medium may include applying an electric charge to one or more shape memory wires of the shape memory alloy actuator.

In some embodiments, the shape memory alloy actuator may be attached to a first end of the damping medium via a first arm member and to a second end of the damping medium via a second arm member. The first and second arm members may, for example, be metal, plastic, or another material. Adjusting the tension on the damping medium may include moving, by the shape memory alloy actuator, the first arm member in a first direction and the second arm member in a second direction, opposite the first direction.

An information handling system may generate a first instruction to adjust a tension on a damping medium of a linear magnetic ram of an input device. For example, the information handling system may detect one or more events, such as in game events, and may generate an instruction for generation of haptic feedback by an input device in response to the one or more events. The information handling system may then transmit the first instruction to the input device. The first instruction may, for example, include an instruction to stretch the damping medium along a first axis, an instruction to adjust the tension on the damping medium by a shape memory alloy actuator attached to the damping medium, an instruction to move, by a shape memory alloy actuator of the linear magnetic ram, a first arm member in a first direction and a second arm member in a second direction, opposite the first direction, an instruction to apply an electric charge to one or more shape memory wires of the shape memory alloy actuator, or an indication of a time period for adjustment of the tension on the damping medium. In some embodiments, the information handling system may transmit a second instruction to cause a hammer of the linear magnetic ram to impact the damping medium after the tension on the damping medium is adjusted.

A hand-held input device, such as a handheld controller, for an information handling system may include a linear magnetic ram. The hand-held input device may be configured to perform the functions described herein. The linear magnetic ram may include a housing, a hammer, a damping medium, and a motor for driving the hammer to impact the damping medium. A tension on the damping medium may be adjustable. The hand-held input device may further include a shape memory alloy actuator connected to the damping medium, and the shape memory alloy actuator may be configured to adjust the tension on the damping medium. The shape memory alloy actuator may be configured to assume a first shape when an electric charge is applied to the shape memory alloy actuator and to assume a second shape when the electric charge is not applied to the shape memory alloy actuator. The shape memory alloy actuator may be attached to a first end of the damping medium by a first arm and a second end of the damping medium by a second arm. The shape memory alloy actuator may be configured to move the first arm in a first direction and the second arm in a second direction, opposite the first direction, when an electric charge is applied to the shape memory alloy actuator. In some embodiments, the shape memory alloy actuator may include one or more shape memory alloy wires.

In some embodiments, an information handling system, or an input device, may include a memory and a processor for performing the methods described herein. A computer program product may include a non-transitory computer-readable medium including instructions for causing an information handling system, or an input device, to perform the method described herein.

For example, the methods described herein may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art. As used herein, "pressing" may refer to touching of a surface or applying pressure to a surface of a device, such as a touchpad.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
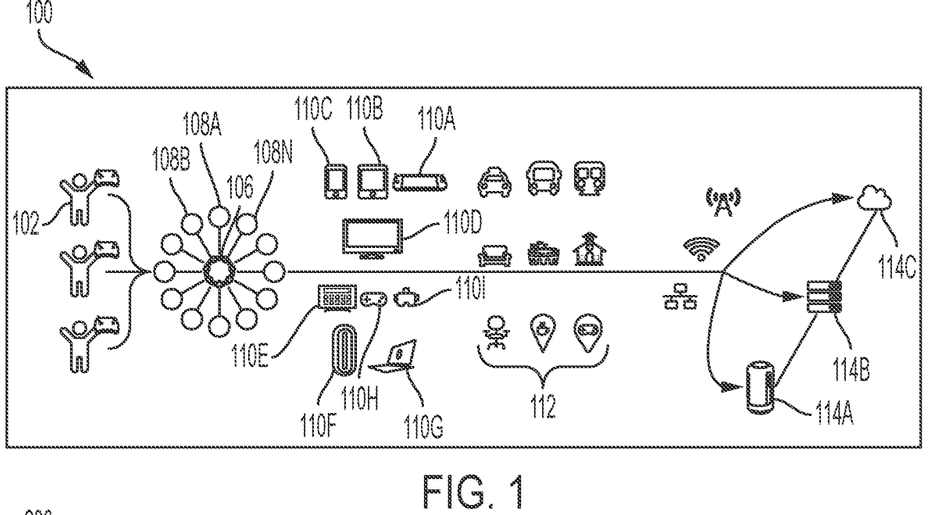
FIG. 1 is a block diagram illustrating aspects of a configurable system for providing services to users according to some embodiments of the disclosure.

FIG. 1 is a block diagram illustrating aspects of a configurable system for providing services to users according some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
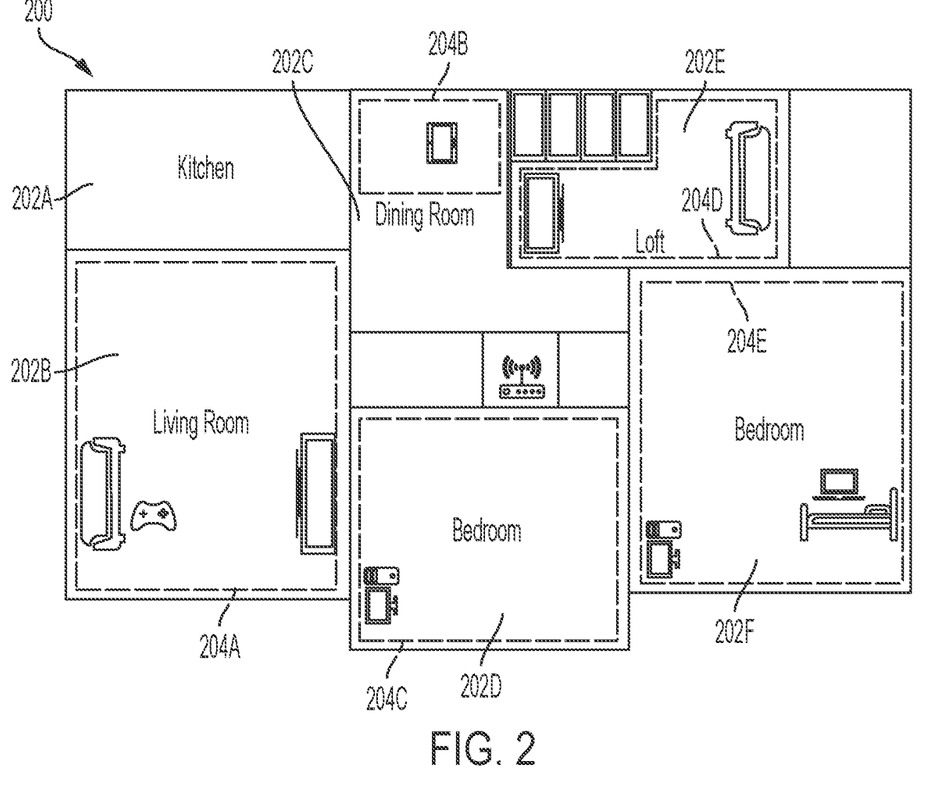
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
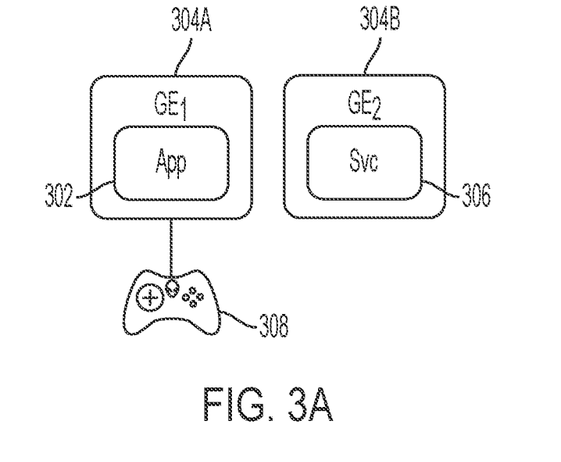
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
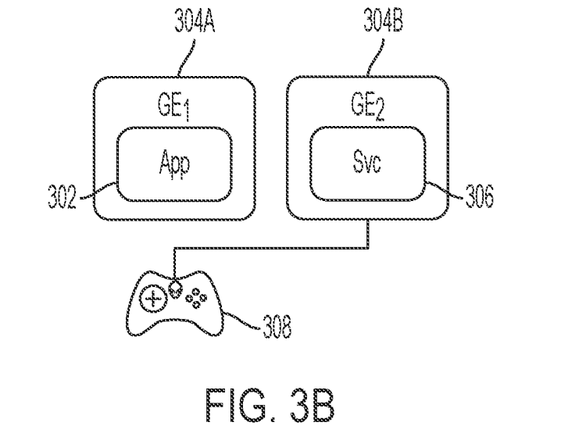
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
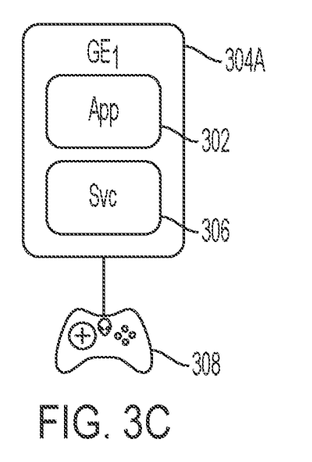
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
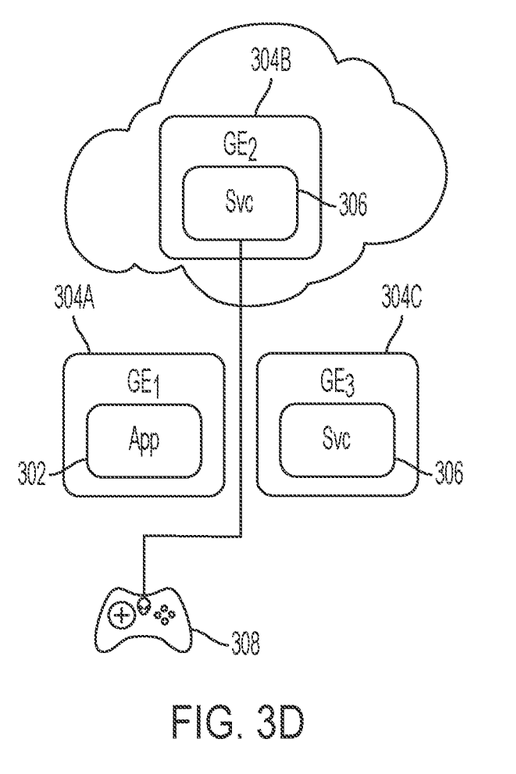
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

An information handling system may be connected to an input device, such as a handheld controller, mouse, or other input device, including one or more linear magnetic rams. Linear magnetic rams may generate wide-band haptic feedback by causing a hammer of the ram to impact a damping medium. For example, linear magnetic rams may generate a magnetic field to move a hammer through an inner cavity of a body of the linear magnetic ram, causing the hammer to impact the damping medium. Such operation may provide a wider range of haptic feedback than is able to be produced by other haptic feedback devices, such as eccentric rotating mass (ERM) rumble modules. Furthermore, linear magnetic rams may be capable of producing haptic feedback effects that are unable to be produced by other haptic feedback devices, such as tachammer mode chassis impacts, where a hammer or magnet of a linear magnetic ram impacts a damping medium at a high velocity to provide an intense haptic feedback event or jolt. A tension on a damping medium of a linear magnetic ram may be adjustable to provide an even wider range of haptic feedback effects. For example, a tension on a damping medium of a linear magnetic ram may be increased or decreased to adjust haptic feedback provided by the linear magnetic ram.

Figure 4:
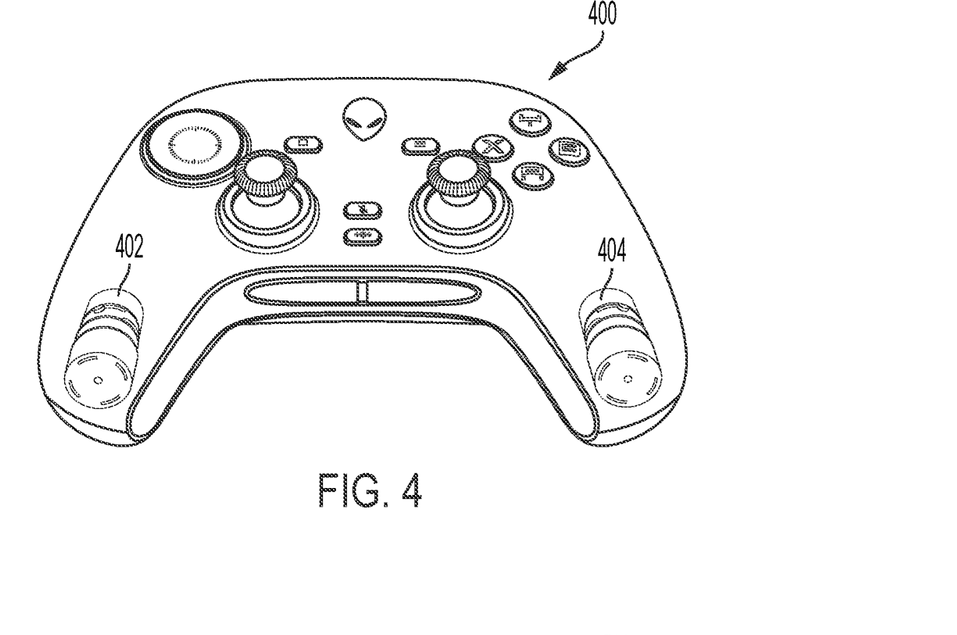
FIG. 4 is a perspective view of an example handheld controller according to some embodiments of the disclosure.

A handheld controller 400, shown in FIG. 4, is one example of an input device that may include a linear magnetic ram module. The handheld controller 400 may include a first linear magnetic ram 402 and a second linear magnetic ram 404 for generating haptic feedback, and the first linear magnetic ram 402 and the second linear magnetic ram 404 may be included in a linear magnetic ram module. In some embodiments, the linear magnetic rams 402, 404 may be included in respective left and right hand grips of a handheld controller 400. In some embodiments, a handheld controller 400 may include fewer or greater than two linear magnetic rams. In some embodiments, linear magnetic rams may be included in other input devices for generation of haptic feedback, such as computer mice, wearable devices, or other input devices.

Figure 5:
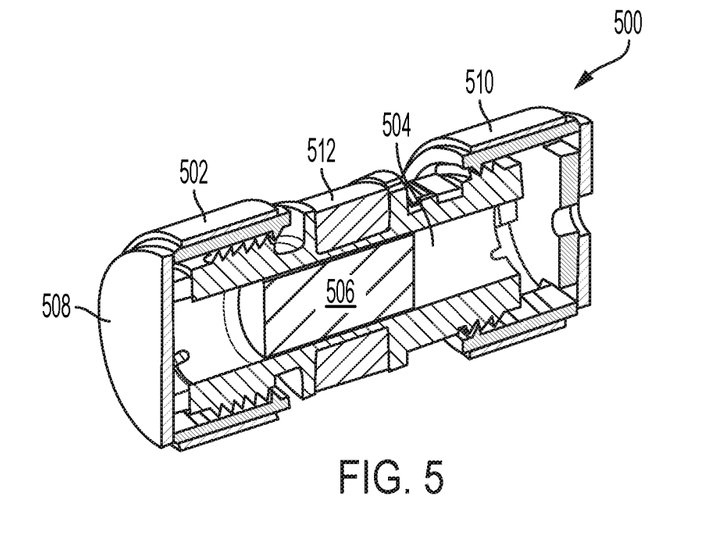
FIG. 5 is a perspective view of a linear magnetic ram according to some embodiments of the disclosure.

A perspective view of an example linear magnetic ram 500 for generating haptic feedback is shown in FIG. 5. The linear magnetic ram 500 may include a housing 502 having a channel 504 for linear movement of a hammer 506 to impact a damping medium 508. A motor module 510 may generate a magnetic field to move the hammer 506 within the channel 504 to impact the damping medium 508. For example, the motor 510 may cause magnet 512 to generate a magnetic field to move the hammer 506 to impact the damping medium 508. The hammer 506 may, for example, be made of a magnetic or metallic substance responsive to a magnetic field generated by magnet 512. A tension on the damping medium 508 may be adjustable to produce different haptic effects when the hammer 506 impacts the damping medium 508. In some embodiments, the linear magnetic ram 500 may be controlled to cause the hammer 506 to impact the damping medium 508 and/or to adjust the tension on the damping medium 508 based on events that occur in a gaming application or based on a user profile of a user of the information handling system.

Figure 6:
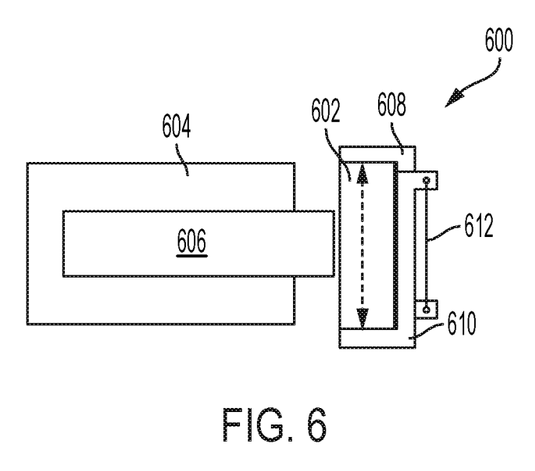
FIG. 6 is a block diagram of a linear magnetic ram having an adjustable damping medium according to some embodiments of the disclosure.

A block diagram of a haptic damping module 600 with a damping medium 602 having an adjustable tension is shown in FIG. 6. A haptic engine 604, which may include a motor and a magnet as described with respect to FIG. 5, may drive a hammer 606 into the damping medium 602. The damping medium 602 may, for example, be made from a polymer or other flexible or semi-flexible material. The damping medium 602 may be attached, at a first end, to a first arm member 608 and at a second end, opposite the first end, to a second arm member 610. The first arm member 608 and the second arm member 610 may be used to adjust a tension on the damping medium 602. For example the first arm member 608 may be moved in a first direction, such as up, and/or the second arm member may be moved in a second direction, such as down, to increase a tension on the damping medium 602. In some embodiments, the first arm member 608 and the second arm member 610 may be made of a polymer, a metal, or another substance. The first arm member 608 and the second arm member 610 may be connected to a shape memory alloy actuator 612. The shape memory alloy actuator 612 may be formed from a shape memory alloy that assumes a first shape when an electric charge is applied and a second shape when the electric charge is not applied. In some embodiments, the shape memory alloy actuator 612 may include one or more shape memory alloy wires. Such wires may have a fast response time to an electric charge and may operate at a low electric charge. For example, when an electric charge is applied to the shape memory alloy actuator 612, the shape memory alloy actuator may expand. Such expansion may push the first arm member 608 upward and the second arm member 610 downward, stretching the damping medium attached to the first and second arm members 608, 610. When then charge is removed, the shape memory alloy actuator 612 may contract, returning the arm members 608, 610 and damping medium 602 to an initial position. In some embodiments, different charges may cause the shape memory alloy actuator 612 to assume different shapes, such as different lengths, allowing varying degrees of tension to be applied to the damping medium 602. In some embodiments, multiple arm members may be attached to different shape memory alloy actuators. For example, a first set of arm members may be adjusted by a first shape memory alloy actuator to stretch the damping medium 602 along a first axis, and a second set of arm members may be adjusted by a second shape memory alloy actuator to stretch the damping medium 602 along a second axis. In some embodiments, the surface of the first arm 608 attached to the damping medium 602 may be parallel to a surface of the first arm 608 connected to the shape memory alloy actuator 612. In some embodiments, the surface of the first arm 608 attached to the shape memory alloy actuator 612 and the surface of the first arm 608 attached to the damping medium 602 may be perpendicular to a direction in which the damping medium 602 is stretched when a charge is applied to the shape memory alloy activator 612.

Figure 7:
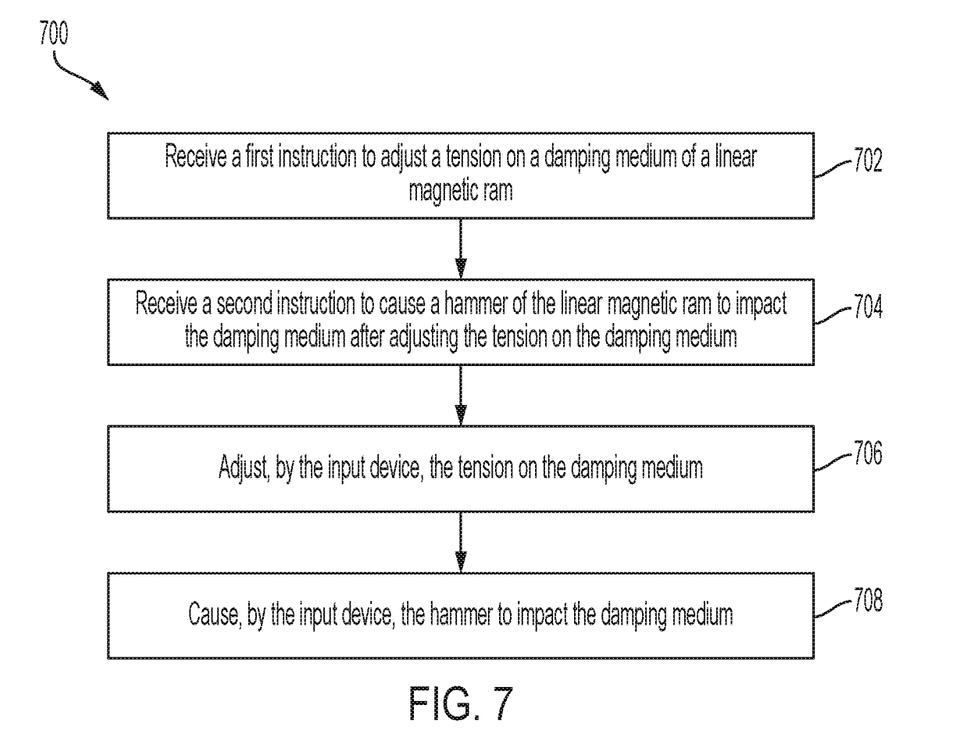
FIG. 7 is a flow chart of an example method for adjusting a tension on a damping medium of a linear magnetic ram according to some embodiments of the disclosure.

An example method 700 for adjusting a tension on a shape memory alloy actuator is shown in FIG. 7. The method 700 may, for example, be performed by an input device for an information handling system, such as a handheld controller. The method 700 may begin at block 702 with receiving a first instruction to adjust a tension on a damping medium of a linear magnetic ram. The first instruction may, for example, indicate a level at which a tension of the damping medium should be set, such as a high tension or a low tension. In some embodiments, the tension indicated by the first indication may be selected from among a plurality of tensions supported by the damping medium, such as two or more tensions. In some embodiments, multiple instructions to adjust tensions on damping mediums of multiple linear magnetic rams of an input device may be received. Instructions for adjustment of tension on a damping medium may, for example, include an indication of a timing of an adjustment to the tension of the damping medium, such as a time at which the tension will be adjusted and/or an amount of time for which the adjusted tension will be applied. In some embodiments, a first instruction to adjust a tension on a damping medium may include a pattern of adjustment of tensions on a damping medium, such as multiple adjustments to a tension on a damping medium and timing information for the multiple adjustments. In some embodiments, an instruction to adjust a tension on a damping medium may, for example, be received from an information handling system to which the input device is connected. For example, such an instruction may be included in an instruction, from the information handling system, to generate haptic feedback in response to one or more in-game events of a gaming application executed by the information handling system or another information handling system. In some embodiments, the instruction to adjust the tension on the damping medium of the linear magnetic ram may include an indication of a specific tension to apply to the damping medium. For example, the instruction to adjust the tension on the damping medium may include an indication of a charge to apply to a shape memory alloy actuator of the damping medium. In some embodiments, the first instruction may be an instruction to turn an adaptive damper including the adaptive damping medium and the shape memory alloy actuator on or off, such as by applying a charge to or removing a charge from the shape memory alloy actuator. In some embodiments, the first instruction may be an instruction to apply a charge to the shape memory alloy actuator to adjust the tension on the damping medium until a hammer of the linear magnetic ram has impacted the damping medium and to remove the charge from the shape memory alloy actuator after the hammer of the linear magnetic ram has impacted the damping medium.

At block 704, the input device may receive a second instruction to cause a hammer of the linear magnetic ram to impact the damping medium after adjusting the tension on the damping medium. Such an instruction may, for example, be included in an instruction, from the information handling system, to generate haptic feedback in response to one or more in-game events of a gaming application executed by the information handling system or another information handling system. Thus, instructions for generating haptic feedback may include both an instruction to adjust a tension on a damping medium and an instruction to cause a hammer of a linear magnetic ram to impact the damping medium after the tension of the damping medium is adjusted. In some embodiments, the second instruction may be an instruction cause a series of impacts to the damping medium in a pattern after the tension of the damping medium is adjusted. In some embodiments, multiple instructions for adjusting a tension of a damping medium and causing a hammer of the linear magnetic ram to impact the damping medium may be received. For example, instructions for causing a linear magnetic ram to impact a damping medium after each of multiple tension adjustments may be received.

At block 706, the input device may adjust the tension on the damping medium based on the first instruction. For example, the input device may increase or decrease a tension on the damping medium. In some embodiments, the input device may adjust a tension on the damping medium along a first axis, such as by stretching the damping medium along the first axis. Adjusting the tension on the damping medium may be performed by a shape memory alloy actuator attached to the damping medium. For example, the shape memory alloy actuator may be attached to a first end of the damping medium via a first arm member and to a second end of the damping medium via a second arm member. Adjusting the tension on the damping medium may include moving, by the shape memory alloy actuator, the first arm member in a first direction and the second arm member in a second direction, opposite the first direction. In some embodiments, one arm member may be stationary, or the damping medium may be attached at one end to another stationary surface, and adjusting the tension on the damping medium may include moving a single arm member, either by a shape memory alloy actuator or another actuator. Adjusting the tension on the damping medium may include applying an electric charge to the shape memory alloy actuator. For example, adjusting the tension on the damping medium may include applying an electric charge to one or more shape memory wires of the shape memory alloy actuator. Applying the electric charge to the shape memory alloy actuator may cause the shape memory alloy actuator to increase in length. In some embodiments, different electric charges may be applied to the shape memory alloy actuator to cause a length of the shape memory alloy to increase to different lengths. In some embodiments, the tension on the damping medium may be adjusted for a first time period, such as a first time period indicated by the first instruction. In some embodiments, adjusting the tension on the damping medium may include adjusting the tension on the damping medium according to a first pattern.

At block 708, the input device may cause a hammer of the linear magnetic ram to impact the damping medium based on the second instruction. For example, the input device may cause the hammer of the linear magnetic ram to impact the damping medium after the tension on the damping medium is adjusted based on the first instruction. Thus, the input device may cause the hammer of the linear magnetic ram to impact the damping medium while the tension of the damping medium is at a level indicated by the first instruction.

An information handling system may instruct an input device connected to the information handling system to adjust a tension of a damping medium of a linear magnetic ram of the input device. An example method 800, shown in FIG. 8, may be performed by an information handling system. The method 800 may begin at block 802 with generating a first instruction to adjust a tension on a damping medium of a linear magnetic ram of an input device. In some embodiments, for example, an information handling system may generate the first instruction in response to an event that occurs in a gaming application, to generate haptic feedback corresponding to the event. The first instruction may, for example, comprise an instruction to stretch the damping medium along a first axis. The first instruction may comprise an instruction to adjust the tension on the damping medium by a shape memory alloy actuator attached to the damping medium. For example, the first instruction may comprise an instruction for an input device connected to the information handling system to apply a charge to a shape memory alloy actuator of the input device, such as to one or more shape memory wires of the shape memory alloy actuator. In some embodiments, the first instruction may include an instruction to move a first arm member attached to a first end of the damping medium in a first direction and to move a second arm member attached to a second end of the damping medium in a second direction opposite the first direction, such as by a shape memory alloy actuator connected to the first and second arm members. In some embodiments, the first instruction may include an indication of a time period for adjustment of the tension on the damping medium. Such an instruction may be the instruction received at block 702 of FIG. 7.

Figure 8:
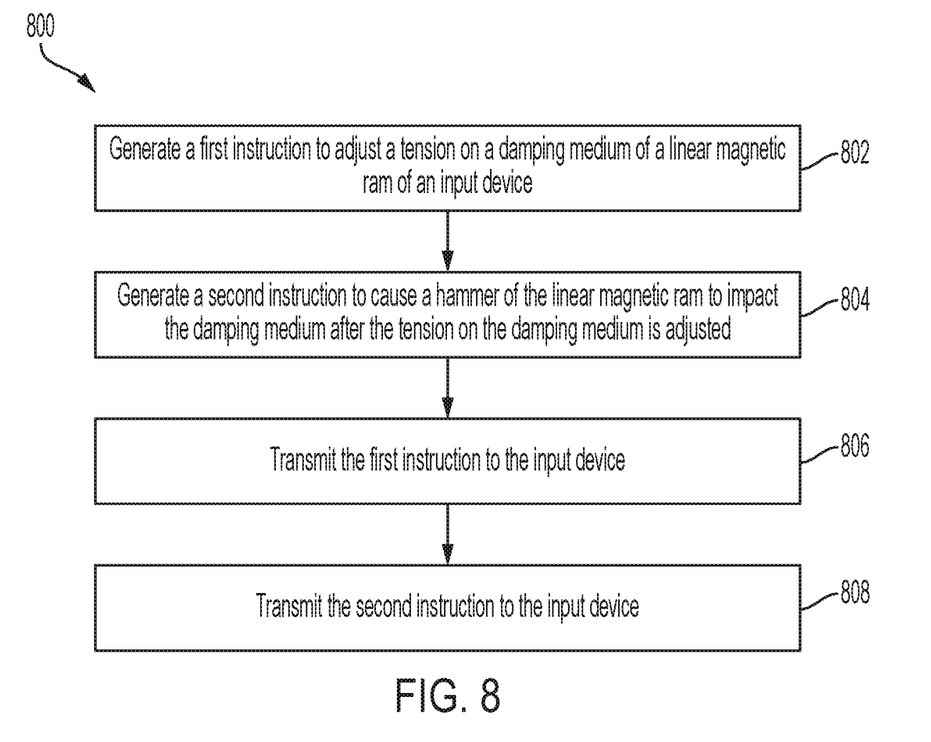
FIG. 8 is a flow chart of an example method for adjusting a tension on a damping medium of a linear magnetic ram according to some embodiments of the disclosure.

At block 804, the information handling system may generate a second instruction to cause a hammer of the linear magnetic ram to impact the damping medium after the tension of the damping medium is adjusted. Such an instruction may be the instruction received at block 704 of FIG. 7.

At block 806, the information handling system may transmit the first instruction to the input device, and, at block 808, the information handling system may transmit the second instruction to the input device. In some embodiments, the information handling system may process a signal for transmission to the handheld controller including the first instruction and the second instruction.

Figure 9:
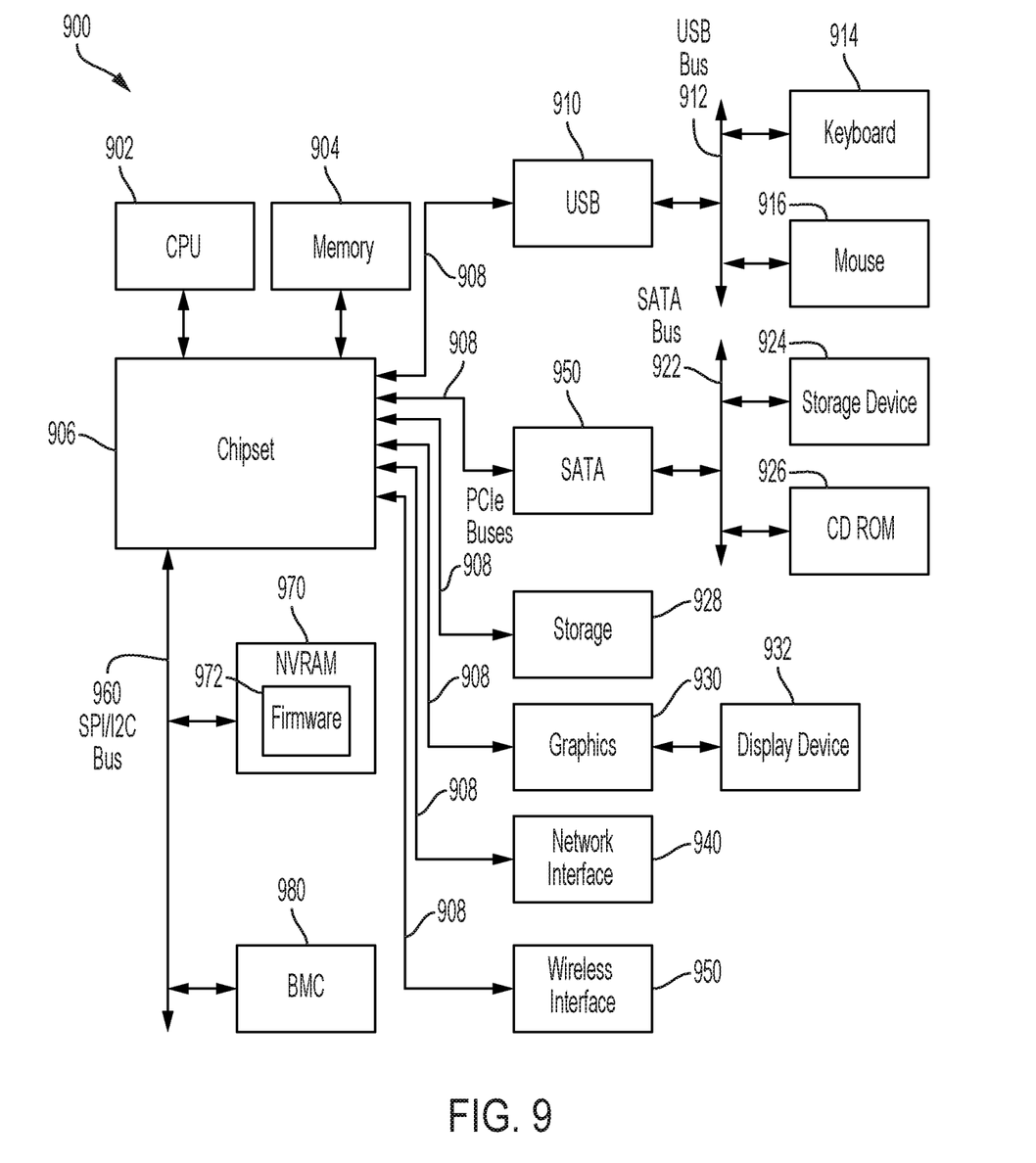
FIG. 9 is a block diagram of an example information handling system according to some embodiments of the disclosure.

FIG. 9 illustrates an example information handling system 900. Information handling system 900 may include a processor 902 (e.g., a central processing unit (CPU)), a memory (e.g., a dynamic random-access memory (DRAM)) 904, and a chipset 906. In some embodiments, one or more of the processor 902, the memory 904, and the chipset 906 may be included on a motherboard (also referred to as a mainboard), which is a printed circuit board (PCB) with embedded conductors organized as transmission lines between the processor 902, the memory 904, the chipset 906, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 902, the memory 904, the chipset 906, and/or other components may be organized as a System on Chip (SoC).

The processor 902 may execute program code by accessing instructions loaded into memory 904 from a storage device, executing the instructions to operate on data also loaded into memory 904 from a storage device, and generate output data that is stored back into memory 904 or sent to another component. The processor 902 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 902 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 906 may facilitate the transfer of data between the processor 902, the memory 904, and other components. In some embodiments, chipset 906 may include two or more integrated circuits (ICs), such as a northbridge controller coupled to the processor 902, the memory 904, and a southbridge controller, with the southbridge controller coupled to the other components such as USB 910, SATA 920, and PCIe buses 908. The chipset 906 may couple to other components through one or more PCIe buses 908.

Some components may be coupled to one bus line of the PCIe buses 908, whereas some components may be coupled to more than one bus line of the PCIe buses 908. One example component is a universal serial bus (USB) controller 910, which interfaces the chipset 906 to a USB bus 912. A USB bus 912 may couple input/output components such as a keyboard 914 and a mouse 916, but also other components such as USB flash drives, or another information handling system. Another example component is a SATA bus controller 920, which couples the chipset 906 to a SATA bus 922. The SATA bus 922 may facilitate efficient transfer of data between the chipset 906 and components coupled to the chipset 906 and a storage device 924 (e.g., a hard disk drive (HDD) or solid-state disk drive (SDD)) and/or a compact disc read-only memory (CD-ROM) 926. The PCIe bus 908 may also couple the chipset 906 directly to a storage device 928 (e.g., a solid-state disk drive (SDD)). A further example of an example component is a graphics device 930 (e.g., a graphics processing unit (GPU)) for generating output to a display device 932, a network interface controller (NIC) 940, and/or a wireless interface 950 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 906 may also be coupled to a serial peripheral interface (SPI) and/or Inter-Integrated Circuit (I2C) bus 960, which couples the chipset 906 to system management components. For example, a non-volatile random-access memory (NVRAM) 970 for storing firmware 972 may be coupled to the bus 960. As another example, a controller, such as a baseboard management controller (BMC) 980, may be coupled to the chipset 906 through the bus 960. BMC 980 may be referred to as a service processor or embedded controller (EC). Capabilities and functions provided by BMC 980 may vary considerably based on the type of information handling system. For example, the term baseboard management system may be used to describe an embedded processor included at a server, while an embedded controller may be found in a consumer-level device. As disclosed herein, BMC 980 represents a processing device different from processor 902, which provides various management functions for information handling system 900. For example, an embedded controller may be responsible for power management, cooling management, and the like. An embedded controller included at a data storage system may be referred to as a storage enclosure processor or a chassis processor.

System 900 may include additional processors that are configured to provide localized or specific control functions, such as a battery management controller. Bus 960 can include one or more busses, including a Serial Peripheral Interface (SPI) bus, an Inter-Integrated Circuit (I2C) bus, a system management bus (SMBUS), a power management bus (PMBUS), or the like. BMC 980 may be configured to provide out-of-band access to devices at information handling system 900. Out-of-band access in the context of the bus 960 may refer to operations performed prior to execution of firmware 972 by processor 902 to initialize operation of system 900.

Firmware 972 may include instructions executable by processor 902 to initialize and test the hardware components of system 900. For example, the instructions may cause the processor 902 to execute a power-on self-test (POST). The instructions may further cause the processor 902 to load a boot loader or an operating system (OS) from a mass storage device. Firmware 972 additionally may provide an abstraction layer for the hardware, such as a consistent way for application programs and operating systems to interact with the keyboard, display, and other input/output devices. When power is first applied to information handling system 900, the system may begin a sequence of initialization procedures, such as a boot procedure or a secure boot procedure. During the initialization sequence, also referred to as a boot sequence, components of system 900 may be configured and enabled for operation and device drivers may be installed. Device drivers may provide an interface through which other components of the system 900 can communicate with a corresponding device. The firmware 972 may include a basic input-output system (BIOS) and/or include a unified extensible firmware interface (UEFI). Firmware 972 may also include one or more firmware modules of the information handling system. Additionally, configuration settings for the firmware 972 and firmware of the information handling system 900 may be stored in the NVRAM 970. NVRAM 970 may, for example, be a non-volatile firmware memory of the information handling system 900 and may store a firmware memory map namespace 900 of the information handling system. NVRAM 970 may further store one or more container-specific firmware memory map namespaces for one or more containers concurrently executed by the information handling system.

Information handling system 900 may include additional components and additional busses, not shown for clarity. For example, system 900 may include multiple processor cores (either within processor 902 or separately coupled to the chipset 906 or through the PCIe buses 908), audio devices (such as may be coupled to the chipset 906 through one of the PCIe busses 908), or the like. While a particular arrangement of bus technologies and interconnections is illustrated for the purpose of example, one of skill will appreciate that the techniques disclosed herein are applicable to other system architectures. System 900 may include multiple processors and/or redundant bus controllers. In some embodiments, one or more components may be integrated together in an integrated circuit (IC), which is circuitry built on a common substrate. For example, portions of chipset 906 can be integrated within processor 902. Additional components of information handling system 900 may include one or more storage devices that may store machine-executable code, one or more communications ports for communicating with external devices, and various input and output (I/O) devices, such as a keyboard, a mouse, and a video display.

In some embodiments, processor 902 may include multiple processors, such as multiple processing cores for parallel processing by the information handling system 900. For example, the information handling system 900 may include a server comprising multiple processors for parallel processing. In some embodiments, the information handling system 900 may support virtual machine (VM) operation, with multiple virtualized instances of one or more operating systems executed in parallel by the information handling system 900. For example, resources, such as processors or processing cores of the information handling system may be assigned to multiple containerized instances of one or more operating systems of the information handling system 900 executed in parallel. A container may, for example, be a virtual machine executed by the information handling system 900 for execution of an instance of an operating system by the information handling system 900. Thus, for example, multiple users may remotely connect to the information handling system 900, such as in a cloud computing configuration, to utilize resources of the information handling system 900, such as memory, processors, and other hardware, firmware, and software capabilities of the information handling system 900. Parallel execution of multiple containers by the information handling system 900 may allow the information handling system 900 to execute tasks for multiple users in parallel secure virtual environments.

The schematic or flow chart diagrams FIGS. 7-8 are generally set forth as logical flow chart diagrams. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
  receiving, by an input device from an information handling system, a first instruction to adjust a tension on a damping medium of a linear magnetic ram of the input device; and
  adjusting, by the input device, the tension on the damping medium based on the first instruction,
  wherein adjusting the tension on the damping medium is performed by a shape memory alloy actuator attached to the damping medium, and
  wherein adjusting the tension on the damping medium comprises applying an electric charge to one or more shape memory wires of the shape memory alloy actuator.

2. The method of claim 1, wherein adjusting the tension on the damping medium comprises stretching the damping medium along a first axis.

3. The method of claim 1, wherein the shape memory alloy actuator is attached to a first end of the damping medium via a first arm member and to a second end of the damping medium via a second arm member, and wherein adjusting the tension on the damping medium comprises moving, by the shape memory alloy actuator, the first arm member in a first direction and the second arm member in a second direction, opposite the first direction.

4. The method of claim 1, wherein the first instruction includes an indication of a time period for adjustment of the tension on the damping medium, and wherein adjusting the tension on the damping medium is further based on the indication of the time period.

5. The method of claim 1, further comprising:
  receiving, by the input device from the information handling system, a second instruction to cause a hammer of the linear magnetic ram to impact the damping medium after adjusting the tension on the damping medium, and
  causing, by the input device, the hammer to impact the damping medium after adjusting the tension on the damping medium.

6. The method of claim 1, wherein linear magnetic rams generate a magnetic field to move a hammer through an inner cavity of a body of the linear magnetic ram.

7. The method of claim 1, wherein the electric charge comprises one or more charges, wherein when one or more electric charges is applied to the shape memory alloy actuator, the shape memory alloy actuator to assume one or more shapes.

8. A method, comprising:
  generating, by an information handling system, a first instruction to adjust a tension on a damping medium of a linear magnetic ram of an input device; and
  transmitting, by the information handling system to the input device, the first instruction,
  wherein the first instruction comprises a second instruction to adjust the tension on the damping medium by a shape memory alloy actuator attached to the damping medium, and
  wherein the second instruction comprises a third instruction to apply an electric charge to one or more shape memory wires of the shape memory alloy actuator.

9. The method of claim 8, wherein the first instruction comprises a second instruction to stretch the damping medium along a first axis.

10. The method of claim 8, wherein the shape memory alloy actuator is attached to the a first end of the damping medium via a first arm member and to a second end of the damping medium via a second arm member, and wherein the second instruction comprises a third instruction to move, by the shape memory alloy actuator, the first arm member in a first direction and the second arm member in a second direction, opposite the first direction.

11. The method of claim 8, wherein the first instruction includes an indication of a time period for adjustment of the tension on the damping medium.

12. The method of claim 8, further comprising:
generating, by the information handling system, a second instruction to cause a hammer of the linear magnetic ram to impact the damping medium after the tension on the damping medium is adjusted; and
transmitting, by the information handling system to the input device, the second instruction.

13. The method of claim 8, wherein linear magnetic rams generate a magnetic field to move a hammer through an inner cavity of a body of the linear magnetic ram.

14. The method of claim 8, wherein the electric charge comprises one or more charges, wherein when one or more electric charges is applied to the shape memory alloy actuator, the shape memory alloy actuator to assume one or more shapes.

15. A hand-held input device for an information handling system comprising:
a linear magnetic ram, wherein the linear magnetic ram comprises:
a housing;
a hammer;
a damping medium;
a motor for driving the hammer to impact the damping medium; and
a shape memory alloy actuator connected to the damping medium, wherein the shape memory alloy actuator is configured to adjust the tension on the damping medium,
wherein a tension on the damping medium is adjustable, and
wherein the shape memory alloy actuator is configured to assume a first shape when an electric charge is applied to the shape memory alloy actuator and a second shape when the electric charge is not applied to the shape memory alloy actuator.

16. The hand-held input device of claim 15, wherein the shape memory alloy actuator is attached to a first end of the damping medium by a first arm and a second end of the damping medium by a second arm.

17. The hand-held input device of claim 16, wherein the shape memory alloy actuator is configured to move the first arm in a first direction and the second arm in a second direction, opposite the first direction, when an electric charge is applied to the shape memory alloy actuator.

18. The hand-held input device of claim 15, wherein the shape memory alloy actuator comprises one or more shape memory alloy wires.

19. The hand-held input device of claim 15, wherein linear magnetic rams generate a magnetic field to move a hammer through an inner cavity of a body of the linear magnetic ram.

20. The hand-held input device of claim 15, wherein the electric charge comprises one or more charges, wherein when one or more electric charges is applied to the shape memory alloy actuator, the shape memory alloy actuator to assume one or more shapes.

* * * * *